United States Patent [19]

Aho, Jr. et al.

[11] Patent Number: 5,289,900

[45] Date of Patent: Mar. 1, 1994

[54] MULTI-FUNCTIONAL SERVICE FOR LUBRICATION TANK

[75] Inventors: Wilho V. Aho, Jr., West Palm Beach; Terry H. Strout, Palm City, both of Fla.

[73] Assignee: United Technologies Corporation, Hartford, Conn.

[21] Appl. No.: 998,091

[22] Filed: Dec. 28, 1992

[51] Int. Cl.[5] ............................................. F01M 11/04
[52] U.S. Cl. .................. 184/105.1; 141/324; 141/121; 184/109; 137/577
[58] Field of Search ............... 184/105.1, 109; 141/16, 141/324, 121; 137/587

[56] References Cited

U.S. PATENT DOCUMENTS

| | | | |
|---|---|---|---|
| 2,588,869 | 3/1952 | Pinaire | 137/577 |
| 3,211,535 | 10/1965 | Hirahara | 137/577 |
| 4,699,250 | 10/1987 | Hiestand | 184/105.1 |

FOREIGN PATENT DOCUMENTS 0775493  10/1980  U.S.S.R. .............................. 137/577

*Primary Examiner*—Thomas E. Denion
*Attorney, Agent, or Firm*—Norman Friedland

[57] ABSTRACT

The services normally associated with the lubrication oil tank used on aircraft are made dependent of each other by the judicious location of the various service housings, inlet ports and internal passages. The caps of the pressure fill port and overfill port are sequentially removable in order to prevent fill while the overfill port is blocked off. The overfill port and JOAP port are combined and internal valving automatically responds to the type of service called for.

7 Claims, 8 Drawing Sheets

5,289,900

MULTI-FUNCTIONAL SERVICE FOR LUBRICATION TANK

DESCRIPTION

1. Technical Field

This invention relates to lubrication oil tanks for gas turbine engines used in aircraft and particularly to the service adapter system that provides pressure filling, pressure overfilling, manual filling, and sample removal capabilities.

2. Background Art

Oil tanks for aircraft that are mounted on the wing have over the years been serviced by ground cart support equipment for filling and removal of test oil samples. Not unlike fuel tanks mounted on the wings of an aircraft, the oil tank would include a fill port that is filled from a ground cart which would include a nozzle connected on the end of a hose that is adapted to fit into a complementary capped port. The ground cart also has a similar overfill hose which simultaneous is attached during oil tank servicing to return excess oil to the cart. The port, as well as the nozzle, includes normally biased closed valves that prevents the fuel from leaking out when the cap is removed and before the fill nozzle is engaged.

Examples of fuel tanks exemplary of this type of tank is disclosed in U.S. Pat. No. 3,045,721 granted to R.P. Shepherd et al on Jul. 24, 1962 entitled "Under-Wing Fueling Nozzle" and U.S. Pat. No. 2,737,401 granted to G.W. Lindsay on Mar. 6, 1956 and entitled "Fuel Servicing Nozzle". However, the fuel tank unlike the lubrication oil tank does not provide service functions that are unique with lubrication oil tanks. For example, the oil tank must not be overfilled as it could cause harm to the working parts of the engine. Means must be provided to extract samples for the joint oil analysis program (JOAP) normally associated with aircraft oil tanks. Typically, in order to provide these functions the oil tank would have a multiple of independent ports around various exterior locations in the tank to allow performance of these services. Various locations increase the size and/or number of access ports required in the aircraft to service the oil system. By co-locating these revices the number and size of access panels in the aircraft is minimized. A single "daily door" can be utilized. Since each of these services were heretofore independent of each other, mis-servicing could result. As mentioned above overservice of the lubrication system could ultimately cause serious consequences to the engine.

The heretofore known lubrication oil tanks would typically include a pressure fill adapter, a pressure overfill adapter, and oil analysis port and in many instances, a manual fill adapter. All of these adapters and ports would be located at various locations around the surface of the oil tank and they would all be independent of each other.

SUMMARY OF THE INVENTION

An object of this invention is to provide means to integrate the service functions provided for lubrication oil tanks associated with aircraft.

A feature of this invention is to combine the functions associated with 1) pressure fill adapter, 2) pressure overfill adapter, 3) manual fill adapter and 4) oil analysis port.

The foregoing and other features of the present invention will become more apparent from the following description and accompanying drawings.

BEST MODE FOR CARRYING OUT THE INVENTION

Figure 1:
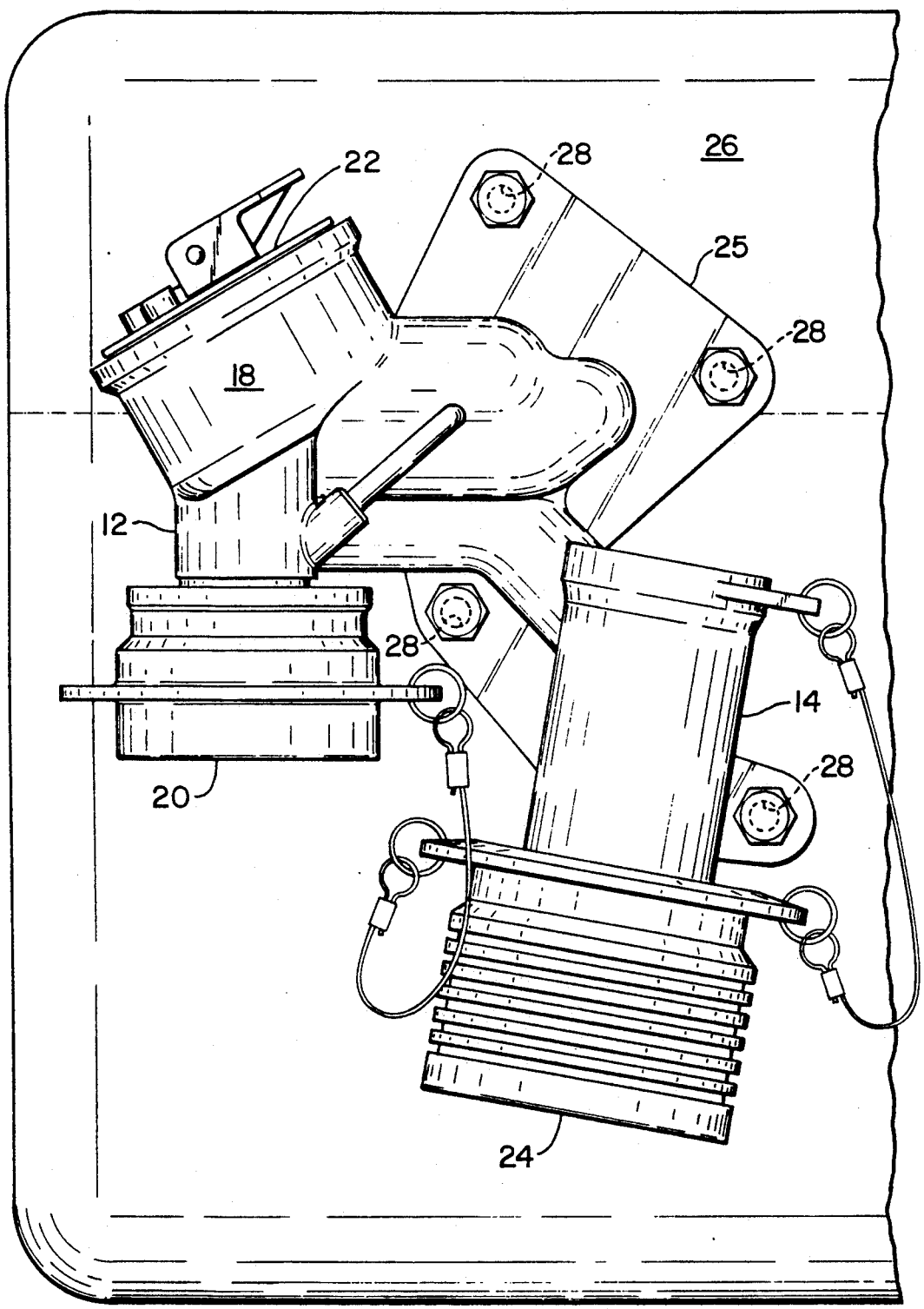
FIG. 1 is a view in front elevation illustrating the service housings for the oil tank lubrication services.
Figure 2:
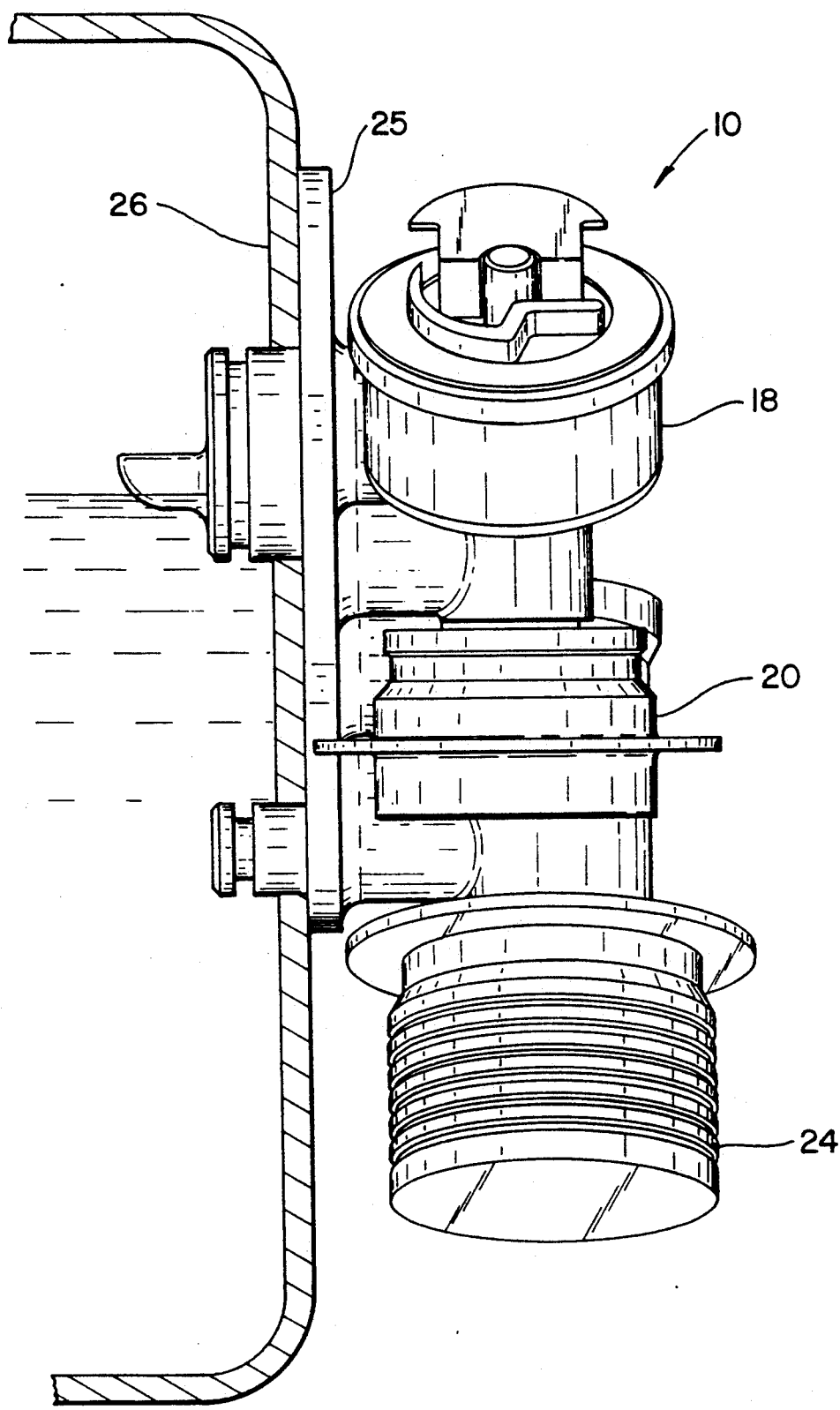
FIG. 2 is a side elevation view of the services.
Figure 3:
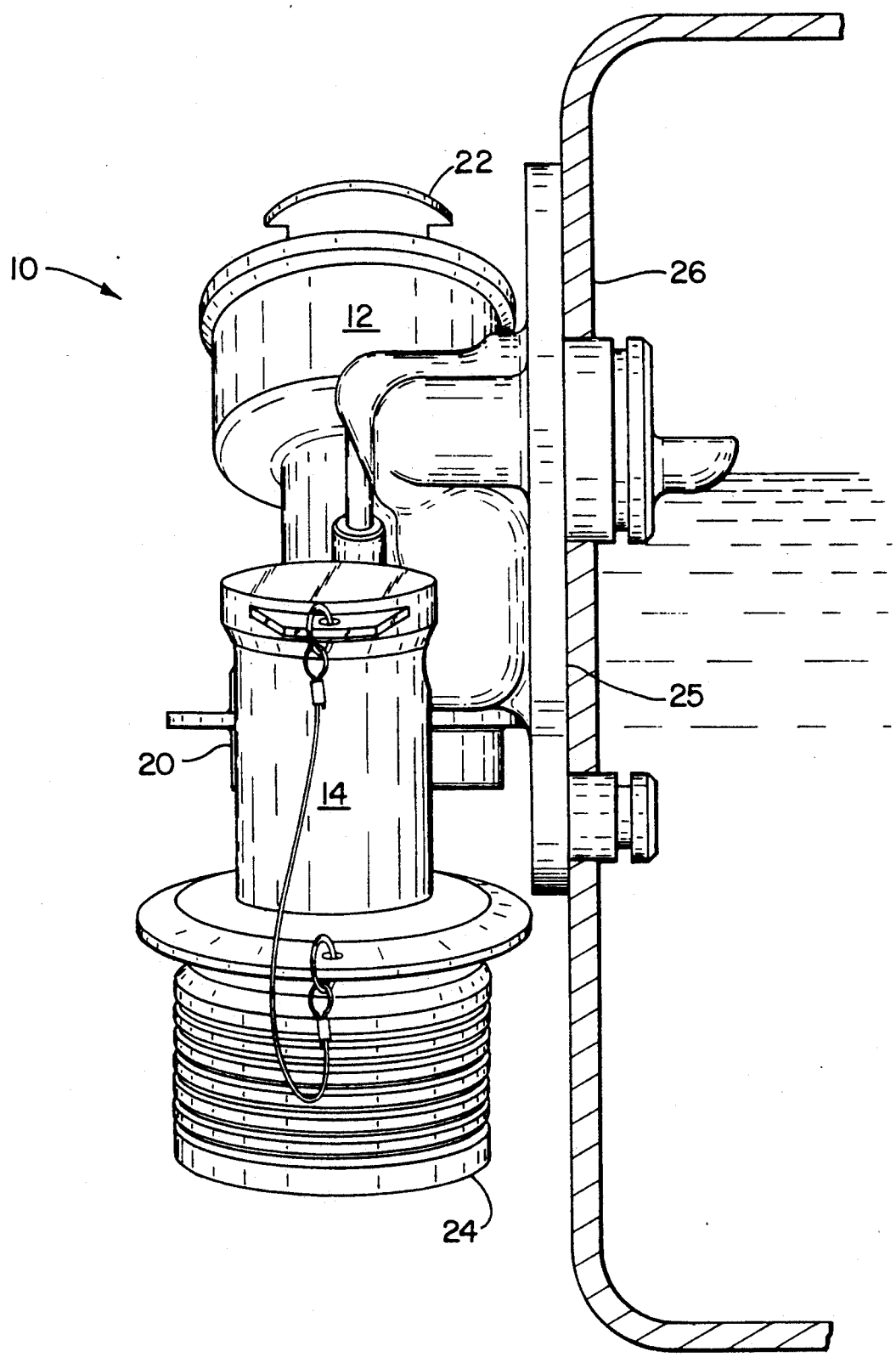
FIG. 3 is a side elevation view of the services.
Figure 4:
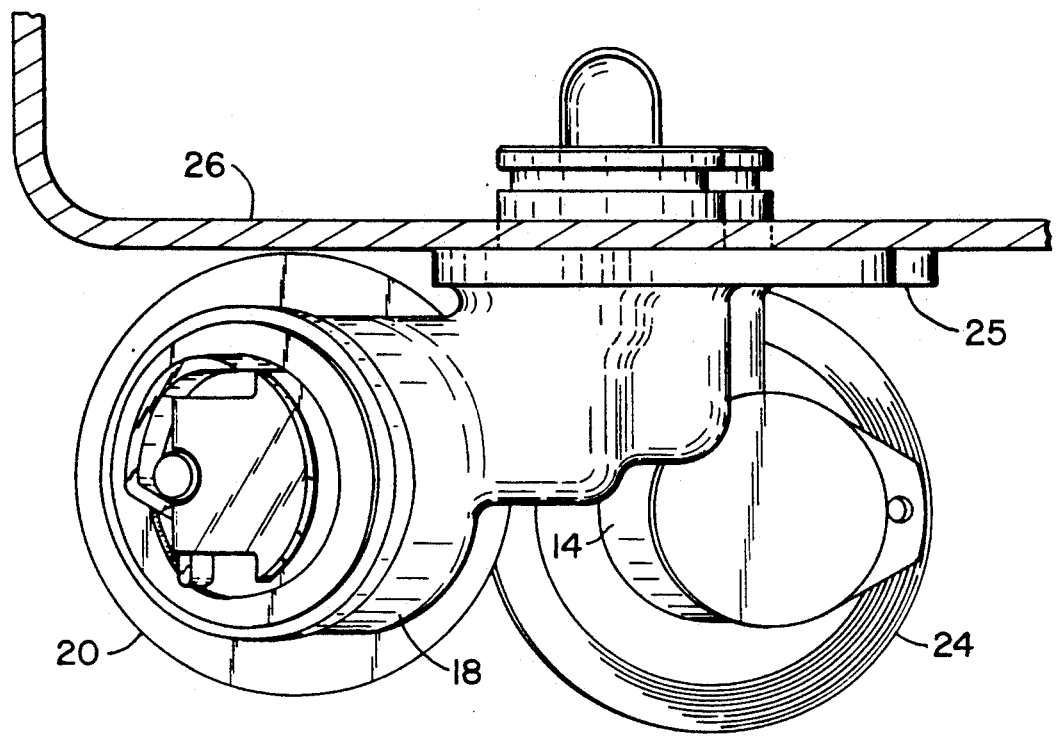
FIG. 4 is a top view of the housing depicted in FIG. 1.
Figure 5:
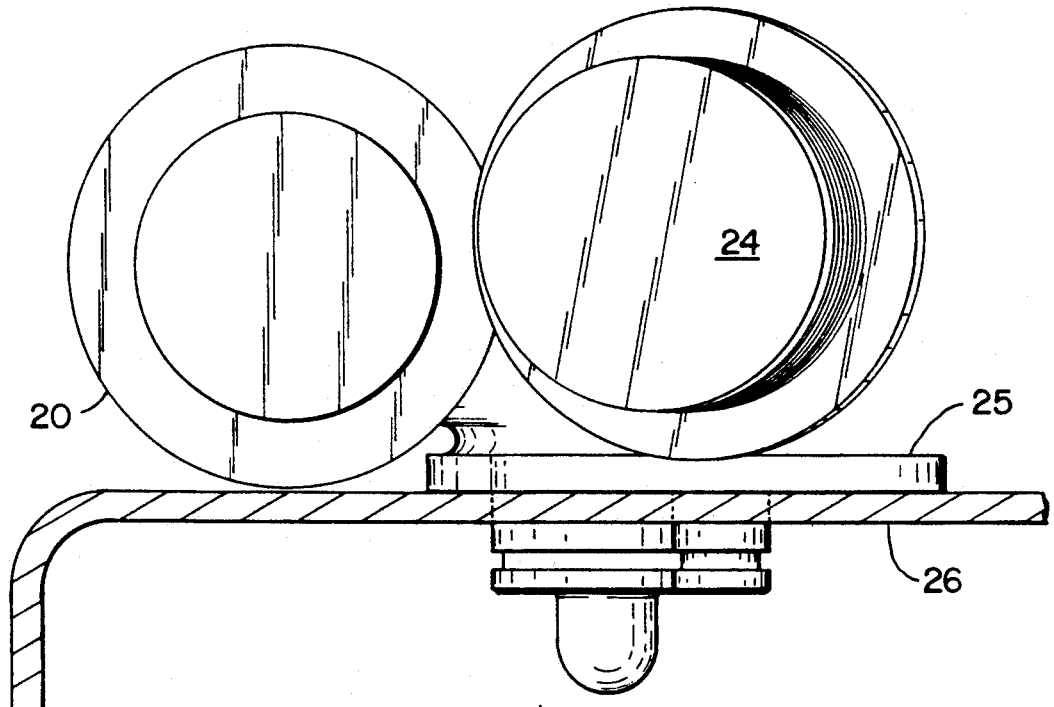
FIG. 5 is a bottom view of the housing depicted in FIG. 1.

While the preferred embodiment being described herein shows this invention utilizing four separate, but dependent services for a oil lubrication tank, as one skilled in the art will appreciate the number of services that may be employed is predicated on the particular application and is within the scope of this invention. The invention can best be understood by referring to FIGS. 1-7 that show the housings of the various services and the various passageways in these housing to show the flow path of the oil as the services are being employed. The lubrication system service adapter generally illustrated by reference numeral 10 includes the pressure fill adapter housing 12, housing 14 that contains a single port 16 that is utilized by both the oil analysis and overfill adapter and the manual fill adapter housing 18. Suitable caps or covers 20 and 22 for the pressure fill adapter housing 12 and the oil analysis and overfill adapter port 18 serve to prevent access to the interior passages formed in the housings as well as keeping out foriegn debrie. Cap 24 for the manual fill adapter housing 18 serves to close off the interior passages. These caps are of the self-locking types that are typically used in military apparatus that assure the caps do not inadvertently become dislodged. One type of cap includes a plunger that displaces circumferentially spaced balls that fit into an annular groove formed in the stem of the housing. Depressing of the plunger allows the balls to retract into a detente to allow removal of the cap. Inasmuch as the caps are not a part of this invention the details thereof are omitted herefrom for the sake of simplicity and convenience. Caps of this type are known in the industry as Shaw Aero Standard 417-series cap.

A flat plate-like bracket 25 serves to mount the lubrication system adapter housing 10 to the oil tank generally indicated by reference numeral 26. A plurality of apertures 28 located in bracket 25 accommodate bolts or the like that permit the housing 10 to be mounted to the tank 26.

Figure 6:
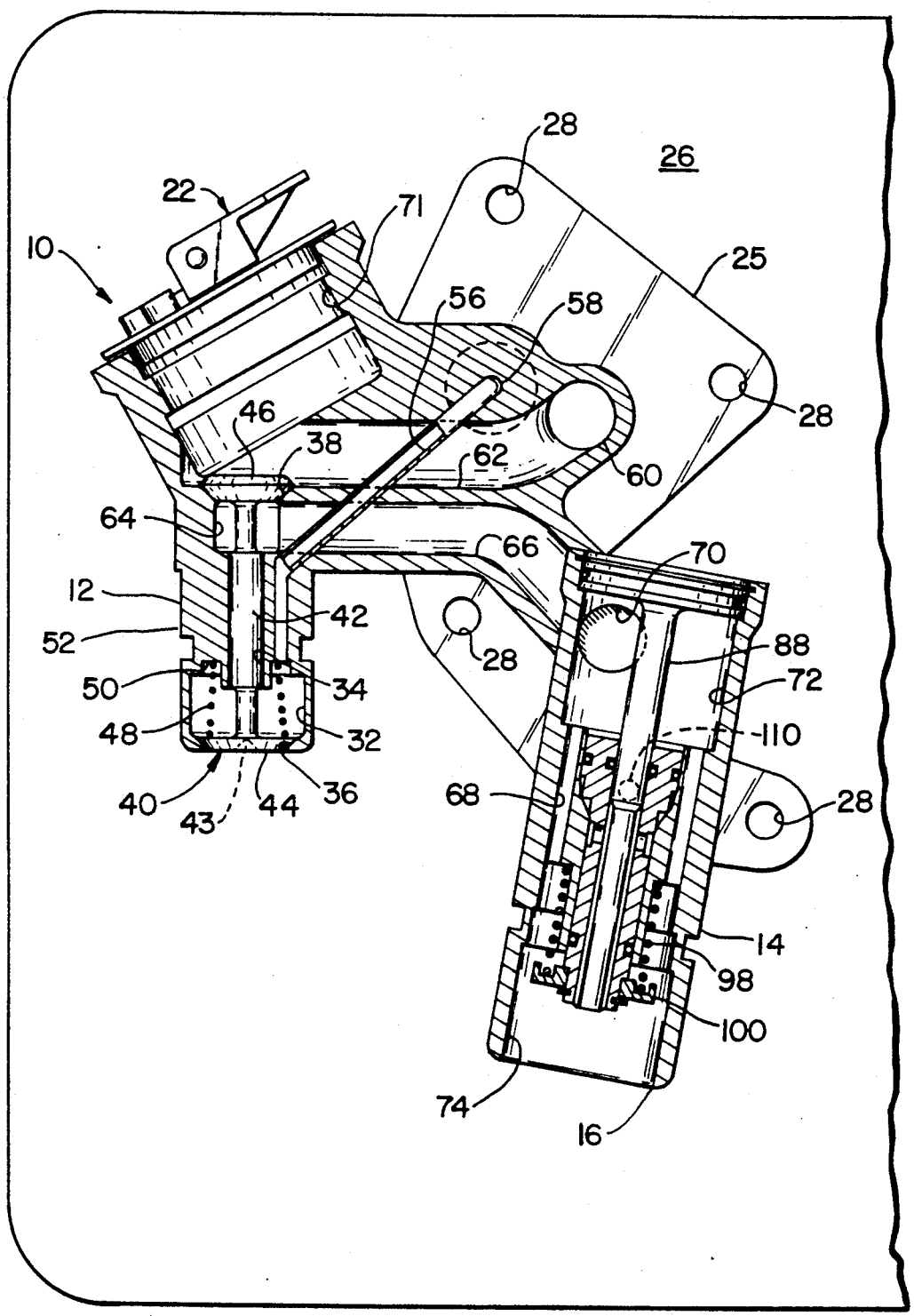
FIG. 6 is a sectional view taken longitudinally of the front elevation of FIG. 1.
Figure 7:
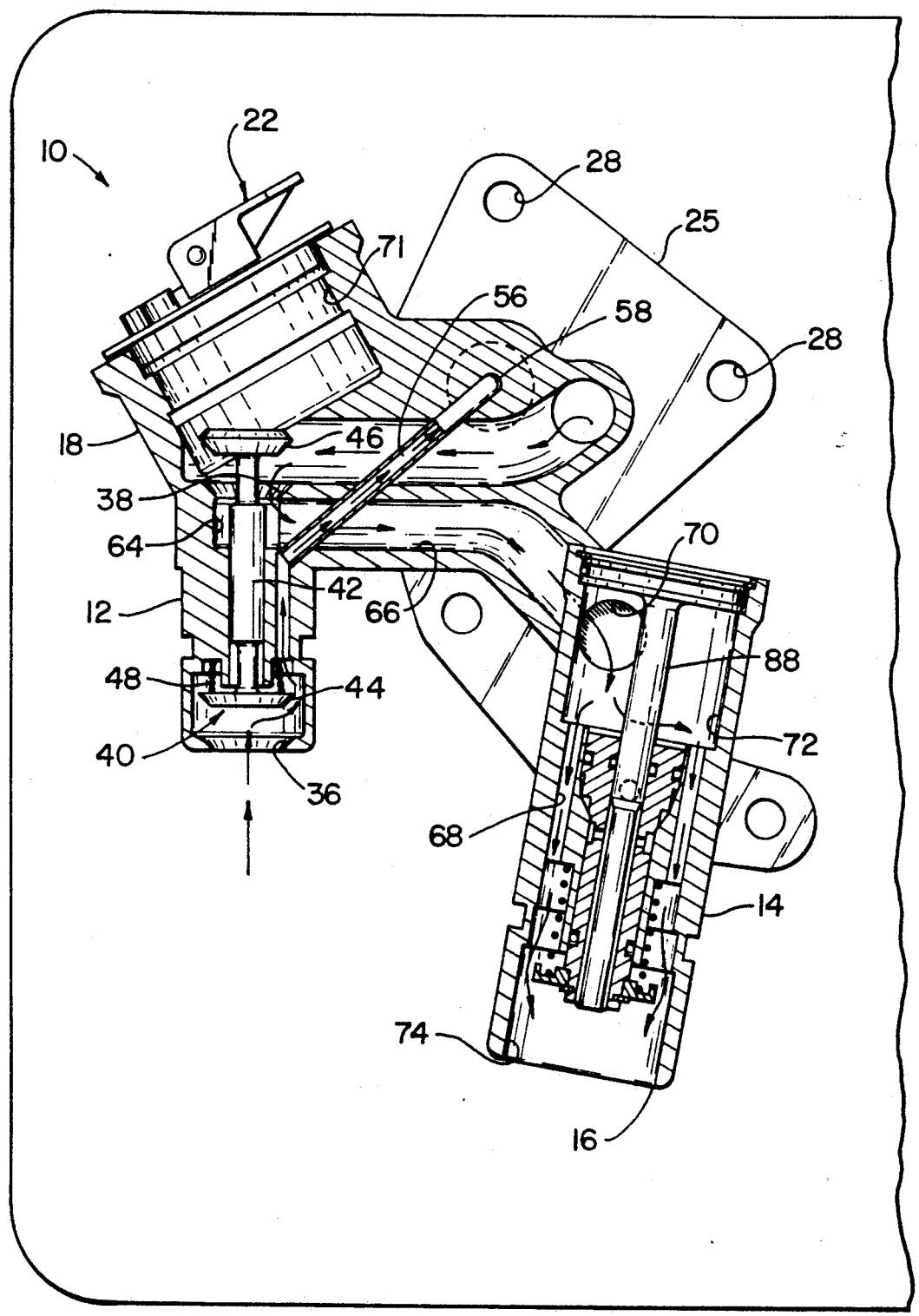
FIG. 7 is a view in section illustrating the pressure fill service in operation.
Figure 8:
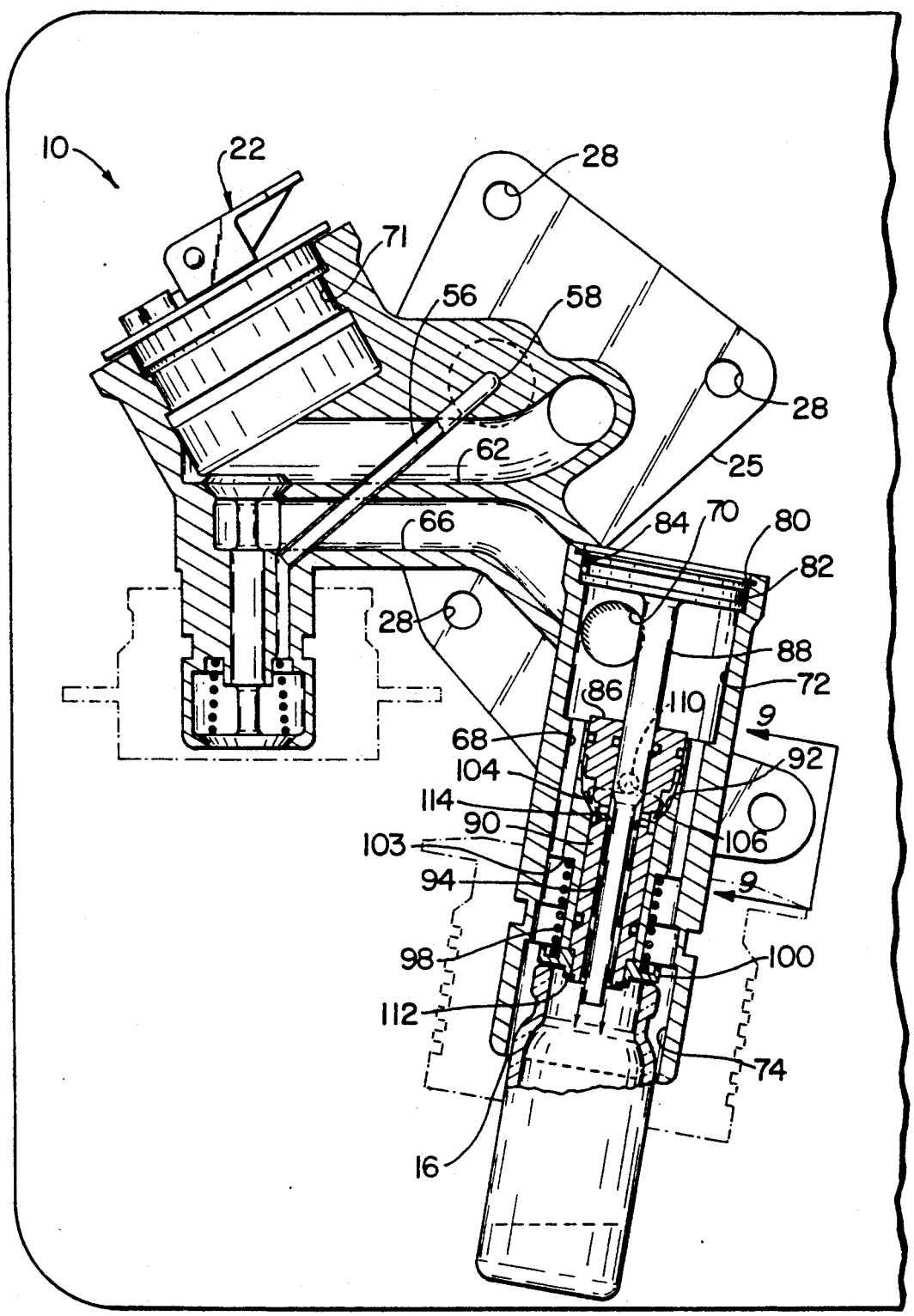
FIG. 8 is a view in section and partially in phantom illustrating the JOAP service in operation.
Figure 9:
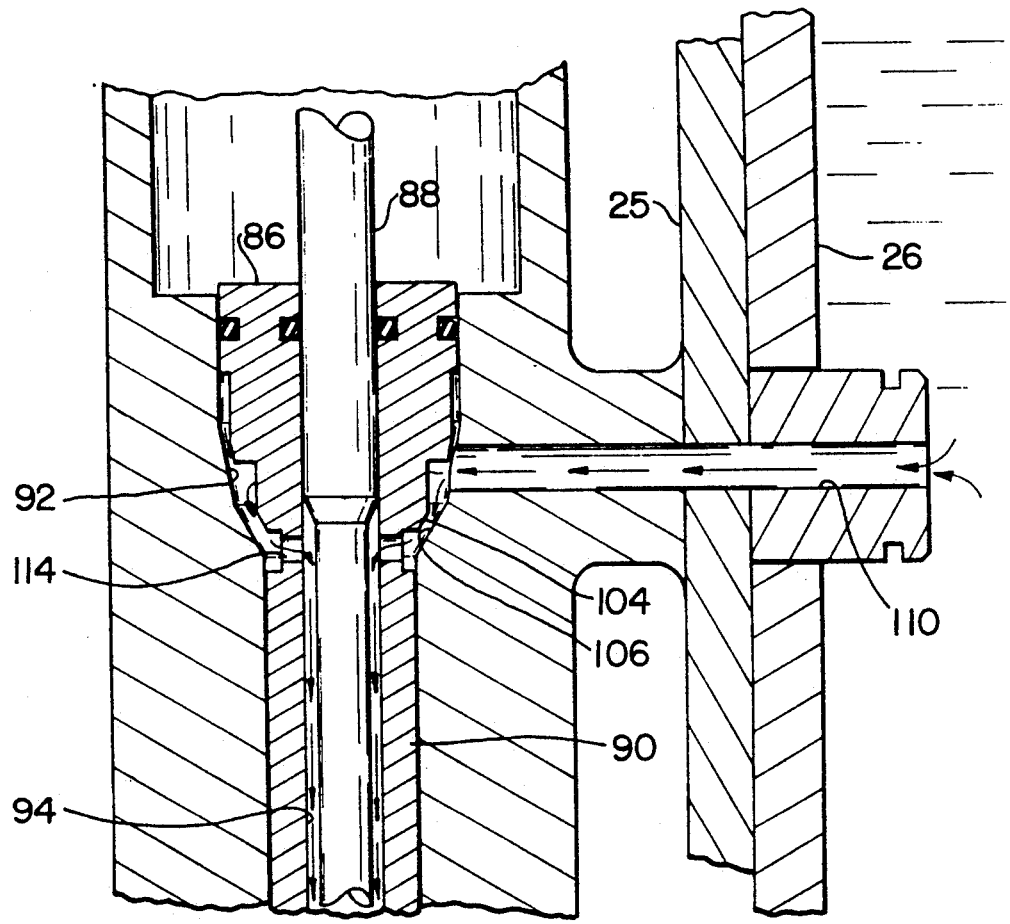
FIG. 9 is an enlarged partial view illustrating the flow of fluid when a JOAP sample is being taken.

According to this invention and as best seen in FIGS. 6, 7 and 8, the pressure fill adapter housing 12 includes a larger diameter recess 32 communicating with a central longitudinal bore 34 and opposing valve seats 36 and 38. Spool valve 40 including a stem 42, a valve element 44 and valve element 46 cooperates with and complements valve seats 36 and 38, respectively. Coil spring 48 having one end bearing against the shoulder 50 formed in housing 12 and the opposite end bearing against the inner surface of valve element 44 biases valve 40 in the closed position as shown in FIG. 6.

In operation a nozzle from the oil source that fills the tank includes an adapter that fits the outer diameter of the neck 52 of housing 12 and includes apparatus that engages the "V" shaped slot 43 formed in the outer surface of valve element 44 to urge it upwardly as depicted in FIG. 6 to unseat valve elements 44 and 46. Oil from the nozzle (not shown) is allowed to flow into recess 32, passageway 56 and interconnecting passageway 58 and into the tank 26. As the tank fills and reaches the filled level of the opening 60 which interconnects the tank with the passageway 62, the excess oil will flow pass valve seat 38 into the annular passageway 64 formed in housing 12 and into passageway 66. Passageway 66 is, in turn, connected to the annular passageway 68 and via aperture 70 and bore 72 formed in housing 14.

From the foregoing it is apparent that the overfill oil is allowed to drain from central bore 74 formed in housing 14 and eventually into the ambient or a ketch container (not shown) associated with the housing 14.

In certain installations it is desirable to have a manual fill service that allows the filling of the tank manually. Obviously, when filling manually and in the absence of pressure the flow of the oil relies on gravity and hence, the manual fill housing is located in a higher location relative to the ground than the fill level of the tank. In operation the manual fill cap is removed exposing recess 71 to ambient. Oil is poured in this recess and flows into the tank via the passageway 62, which is the normal route for the overfill drain. When the manual fill port is utilized the pressure fill service is closed and the cap 20 is secured. Obviously, spool valve 40 is in the closed position and passageway 66 is blocked off. Hence, when the oil in the tank exceeds the fill level as described hereinabove the oil will backup and if allowed to continue it will fill recess 71 and flow out through the inlet of the manual fill adapter.

The JOAP sample is obtained through the housing 14 by applying a sample receiving bottle into central bore 74, once cap 24 (FIG. 1) is removed. This system is best understood by referring to FIGS. 7 and 8. A support mechanism generally indicated by reference numeral 78 extends from the top end of housing 16 and is centrally supported in bores 74. Support mechanism consists of a circular platen 80 supported in the shoulder 82 formed in bore 72. An "0" ring 82 formed in the annular groove 84 seals the outer end of bore 70 from loss of oil. Inner sleeve 86 supported to the inner wall of housing 16 or formed integrally therewith is concentrically disposed relative to the longitudinally extending stem 88. Stem 88 is fixed to or made integral with platen 80 and is a stationary member. An inner wall 90 extending radially inward of housing 60 is concentrically disposed relative to inner sleeve and coaxial relative to stem 88 and defines with inner sleeve 86 an annular passage 92 disposed near the upper end of sleeve 86. The diameter of stem 88 is reduced at a location in proximity to the bottom end of annular passage 92 and defines with the inner diameter of inner sleeve 86 a longitudinally extending annular passage 94.

Inner sleeve 86 is in sliding relationship relative to stem 88 and housing 16 and is biased in a downward direction by coil spring 98. Coil spring 98 is supported by spring retainer 100 which is secured to the inner sleeve 86 by the split ring 102 and is bottomed out on shoulder 103 formed on the bottom surface of wall 90.

Valve element 104 formed at the upper end of inner sleeve 86 is contoured and tapered to cooperate with valve seat 106 formed on the inner diameter of wall 90 which is similarly contoured to complement the contour of valve element 104.

In operation to remove a JOAP sample, the sample jar is inserted into bore 74 and the adapter of the jar engages the lower end of inner sleeve 86 and further upward movement of the jar causes the inner sleeve 86 to displace upwardly, compressing coil spring 98 and unseating valve element 104. Oil from the tank 26 will flow out of the tank through passage 110 that communicates with annular passage 92. Oil continues to flow pass valve seat 106 and into annular passage 94 via the circumferentially spaced lateral drilled holes 114 formed in inner sleeve 86 and ultimately into the sample bottle.

In order to assure that the overfill drain will be in the opened or uncovered position when the pressure fill service is placed in the operating position, caps 20 and 24 and the respective housings 12 and 16 are oriented relative to each other so that cap 20 cannot be removed until cap 24 is first removed. This arrangement is intended to encourage the operator servicing the oil system to properly attach the overfill hose before adding oil through the pressure fill. However, with cap 24 removed this system assures that, even if the overfill hose is not attached, the oil from the pressure fill service won't be forced into the engine from the tank if the drain was covered and prevented the overfill from draining to ambient or a ketch basin.

What has been shown by this invention is a completely dependent services system that replaces the heretofore known lubrication tank that included three or more services that were located at various ports around the surface of the tank and were completely independent of each other. This invention judiciously combines the service functions into a unified dependent arrangement that affords the capability of preventing overservicing. The overfill port and JOAP port are combined into one port with internal valving which automatically responds to the type of service being attempted.

The overservice prevention is retained when the manual fill port is being utilized inasmuch as the manual fill port is located with the bottom edge at the full tank level. Over services would merely spill over the manual fill edge. IN the pressure fill mode, overservice is prevented by assuring that the overfill service is in operation before the pressure fill service is placed in operation.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. Means for servicing an oil lubrication system for aircraft engines, said means including:
   an oil tank,
   pressure filling means including a first housing having an inlet port and an outlet port connected to said oil tank for pressure filling said oil tank with oil, overfill means including a second housing having an inlet port means connected to said tank for accommodating oil overfill and sample collecting means in said second housing having a separate inlet means for sampling of the oil in the tank and an outlet port for receiving oil from said inlet port means and said separate inlet means, a valve having a pair of opposing valve elements cooperating with a pair of valve seats formed in a longitudinal passageway in said first housing interconnecting said tank through a second passageway and a third passageway formed in said first housing, whereby said valve elements are deployed to unseat said valve seats so that oil from a pressurized source is admitted into said tank by said third passageway and overfill of the oil in said tank is released from said second housing through one of said valve seats, through a fourth passage and through a discharge outlet port formed in said second housing.

2. Means for servicing an oil lubrication system as claimed in claim 1 including a manual fill means including a third housing disposed higher relative to gravity than said first housing for manually filling said tank, a first inlet port in said third housing and a passageway interconnecting said first inlet port and said tank through said fourth passage when said valve elements are seated against said valve seats.

3. Means for servicing an oil lubrication system as claimed in claim 2 including additional valve means disposed in said second housing for blocking off flow from said separate inlet means and resilient means for urging said valve means in a closed position.

4. Means for servicing an oil lubrication system as claimed in claim 3 including a access port in said second housing for accommodating a sample collecting bottle that engages said valve means for urging it open in opposition to said resilient means.

5. Means as claimed in claim 4 wherein said resilient means is a coil spring.

6. Means as claimed in claim 5 including a centrally disposed fixed stem in said second housing, said valve means including a valve element mounted in sliding relationship to said fixed stem.

7. Means as claimed in claim 6 wherein said inlet port of said pressure filling means includes a removable cover and said outlet port of said second housing includes a second removable cover, said second removable cover being located relative to said removable cover that said removable cover is prevented from being removed until said second removable cover is removed.

* * * * *